(No Model.)

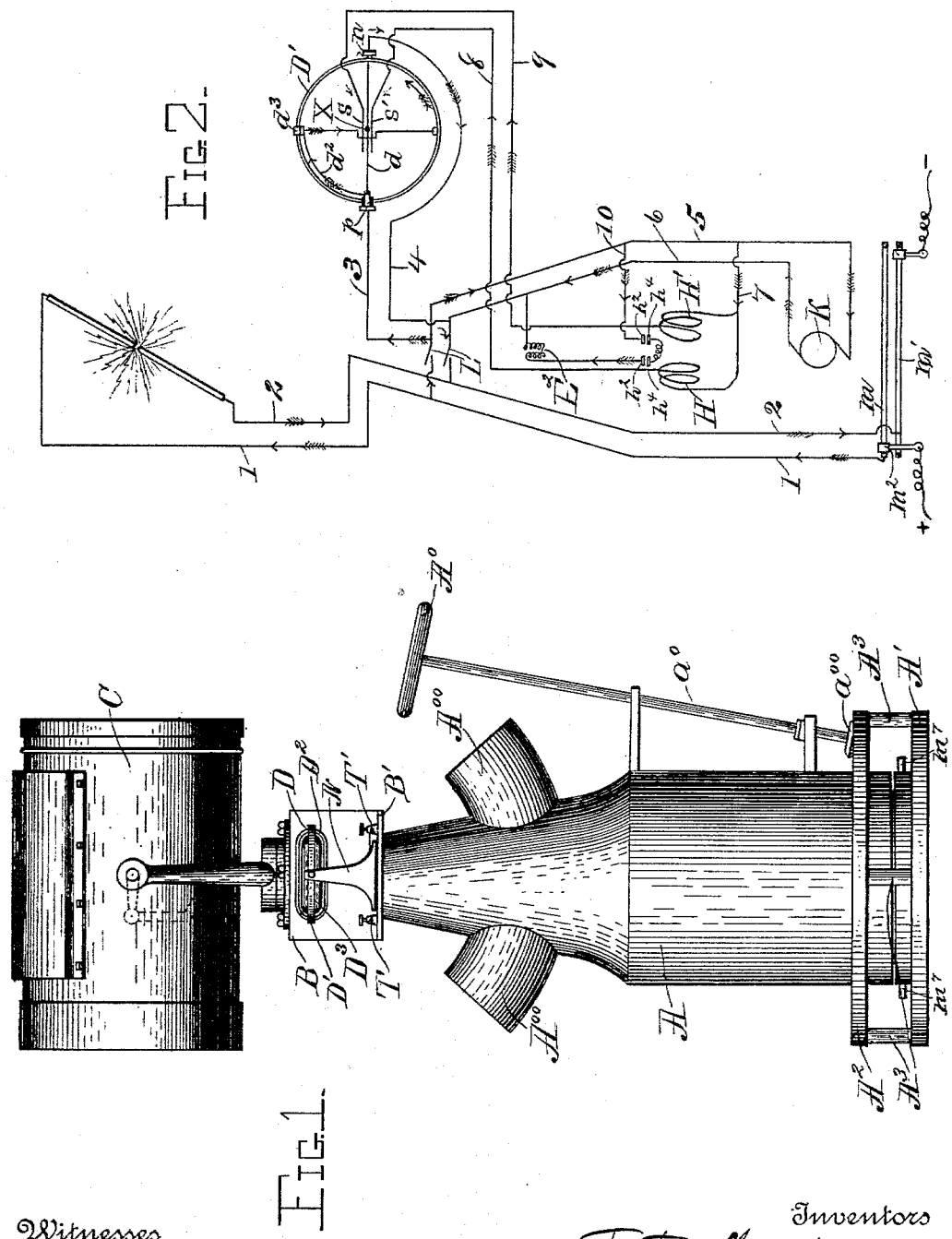

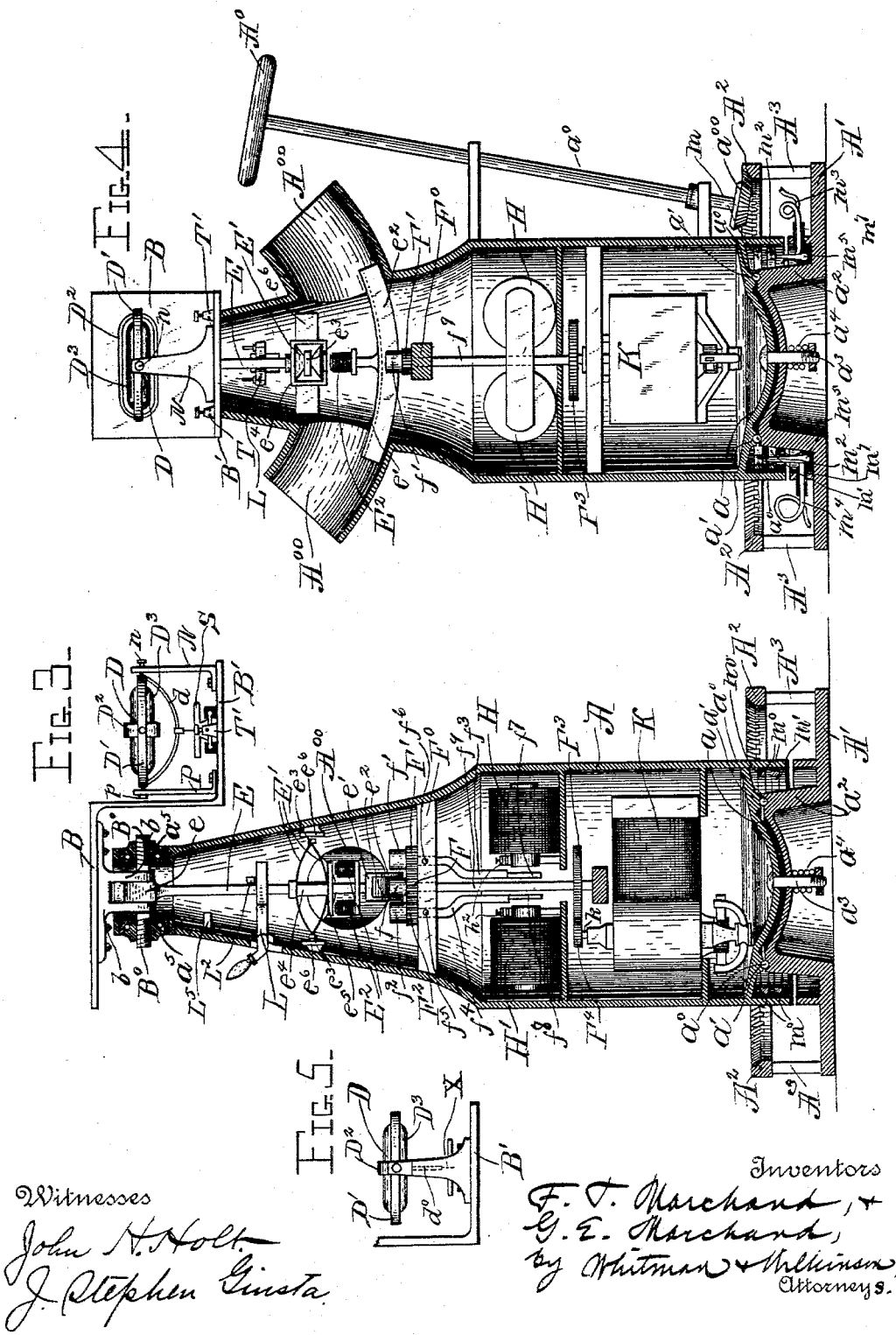

F. T. & G. E. MARCHAND.
SEARCH LIGHT MOUNT.

No. 583,916.

5 Sheets—Sheet 3.

Patented June 8, 1897.

Witnesses
John H. Holt
J. Stephen Ginsta

Inventors
F. T. Marchand
G. E. Marchand,
by Whitman & Wilkinson,
Attorneys.

(No Model.) 5 Sheets—Sheet 4.

F. T. & G. E. MARCHAND.
SEARCH LIGHT MOUNT.

No. 583,916. Patented June 8, 1897.

Witnesses
John H. Holt
J. Stephen Ginsta

Inventors
F. T. Marchand &
G. E. Marchand,
by Whitman & Wilkinson
Attorneys.

(No Model.) 5 Sheets—Sheet 5.
F. T. & G. E. MARCHAND.
SEARCH LIGHT MOUNT.
No. 583,916. Patented June 8, 1897.
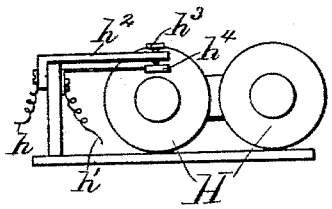
Fig.13.
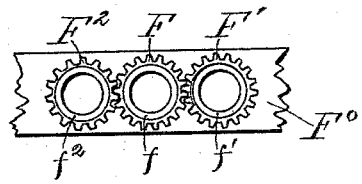
Fig.14.
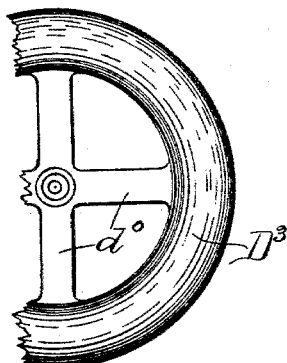
Fig.15.
Fig.16.
Fig.17.
Fig.18.
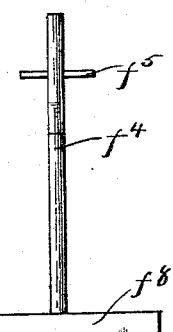
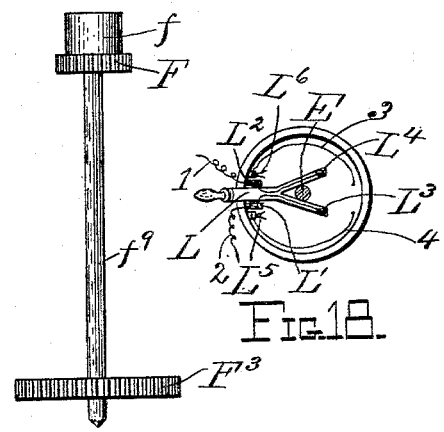
Fig.19. Fig.20.
Fig.22.
Fig.23.
Fig.21.
Witnesses
John H. Holt.
J. Stephen Giusta.
Inventors
F. T. Marchand
G. E. Marchand
by Whitman & Whitman
Attorneys

UNITED STATES PATENT OFFICE.

FRANCIS T. MARCHAND AND GEORGE E. MARCHAND, OF ANNAPOLIS, MARYLAND.

SEARCH-LIGHT MOUNT.

SPECIFICATION forming part of Letters Patent No. 583,916, dated June 8, 1897.

Application filed September 21, 1896. Serial No. 606,560. (No model.)

*To all whom it may concern:*

Be it known that we, FRANCIS T. MARCHAND and GEORGE E. MARCHAND, citizens of the United States, residing at Annapolis, in the county of Anne Arundel and State of Maryland, have invented certain new and useful Improvements in Search-Light Mounts; and we do hereby declare the following to be a full, clear, and exact description of the invention, such as will enable others skilled in the art to which it appertains to make and use the same.

This invention relates to improvements in search-light mounts; and the object of the said invention is to provide a search-light mount which will automatically counteract the rolling and pitching movements of a ship, so that the beam of light maintains its horizontal plane regardless of the varying movements of the ship, allowing any degree of concentration of field without danger of losing the object.

To accomplish this end, the said invention consists of the novel mechanism, combination, and arrangement of parts hereinafter more fully described, claimed, and illustrated in the accompanying drawings, in which—

Figure 6:
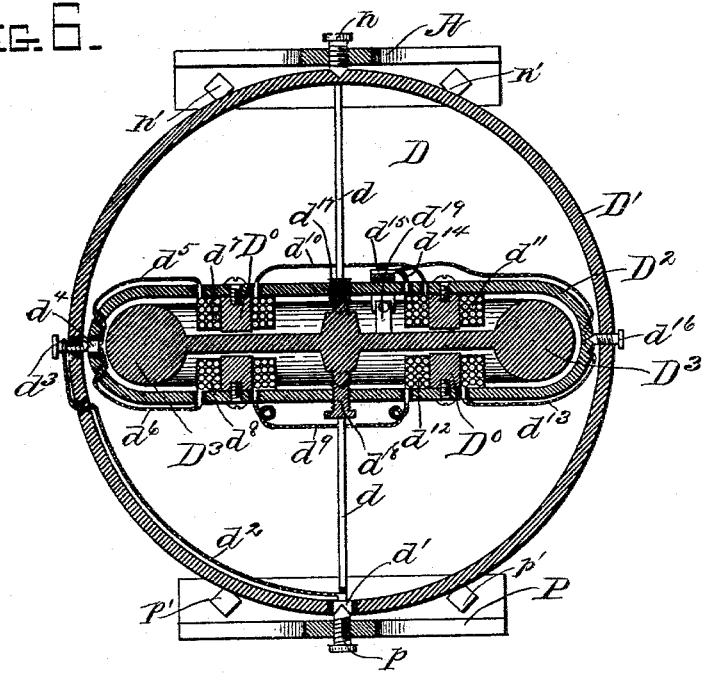
Figure 7:
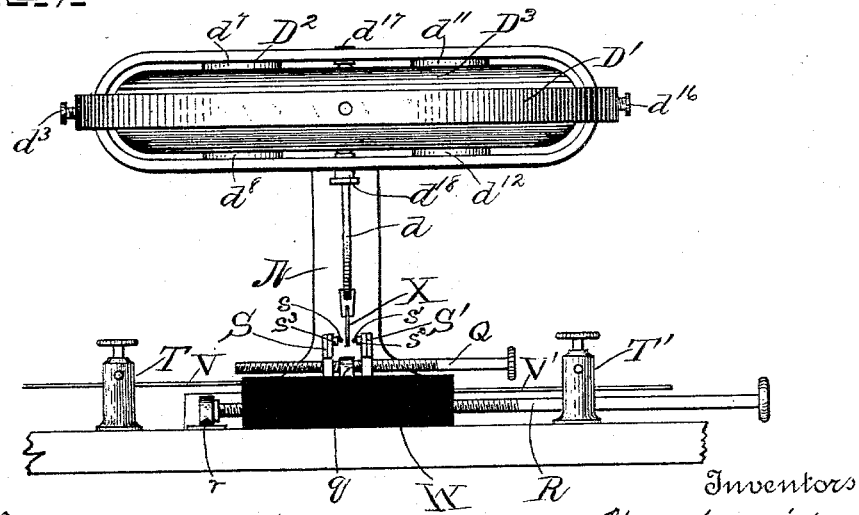
Figure 8:
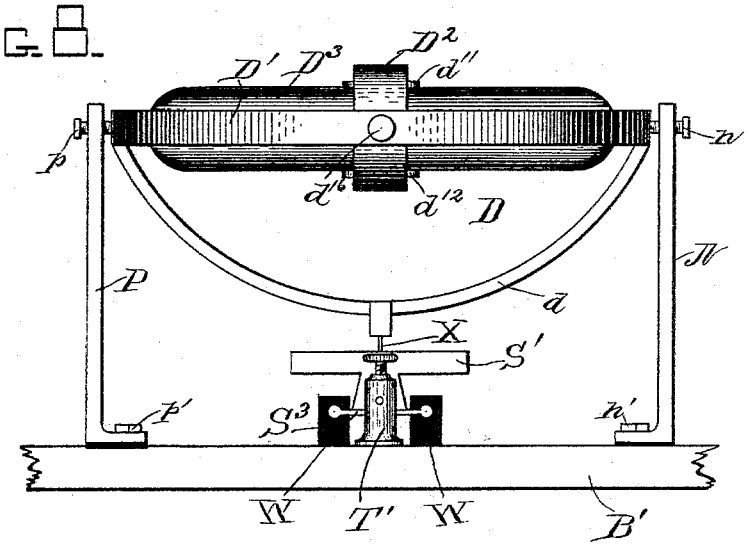
Figure 9:
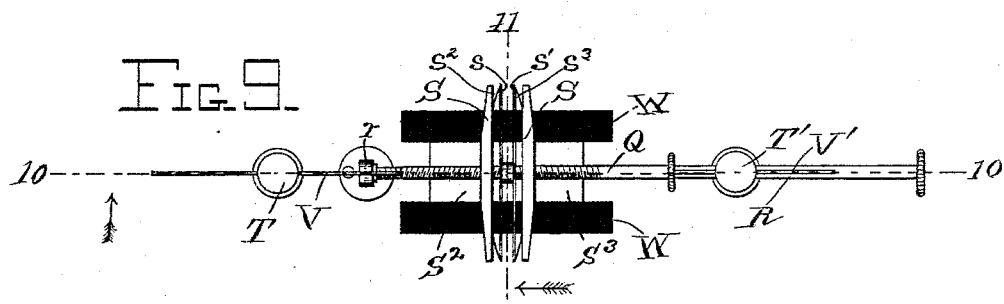
Figure 10:
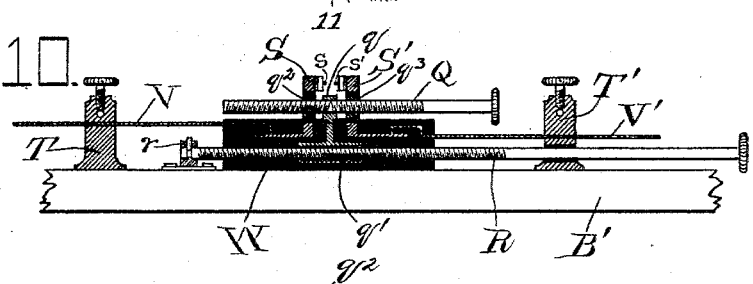
Figure 11:
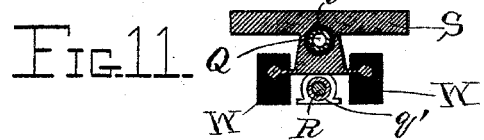
Figure 12:

Figure 1 represents the improved mount in side elevation surmounted by a search-light. Fig. 2 represents a diagram of the electric circuits. Fig. 3 represents a vertical central section through the vertical column and base with the interior portions with gyroscope and platform in side elevation. Fig. 4 represents a section through the same portions of the mount, taken ninety degrees from that in Fig. 3 and looking to the right. Fig. 5 represents the gyroscope mounted on uprights placed at ninety degrees from those shown in Figs. 3 and 4. Fig. 6 represents a horizontal sectional view of the gyroscope with the inner ring and fly-wheel turned ninety degrees from their normal position to show the arrangement of the electrical circuits. Fig. 7 represents in side elevation the contact mechanism with the gyroscope mounted in position over the same with one of the uprights for supporting the gyroscope removed for the sake of clearness in the drawings. Fig. 8 represents in front elevation the contact mechanism with gyroscope mounted over the same. Fig. 9 represents a plan view of the contact mechanism with gyroscope removed. Fig. 10 represents a vertical central section taken on the line 10 10 of Fig. 9 and looking in the direction of the arrow. Fig. 11 represents a cross-section taken along the line 11 11 of Fig. 9 and looking in the direction of the arrow. Fig. 12 represents a detail plan view of one of the sliding jaws. Fig. 13 represents in detail the magnets and contact apparatus in front elevation for operating the brake mechanism. Fig. 14 represents a detail plan view of the gear and cylinders for actuating the pendulum-rod. Fig. 15 represents a plan view of the gyroscope fly-wheel with a portion broken away. Fig. 16 represents a detail view, in front elevation, of one of the lever-arms and armature for actuating the gears shown in detail in Fig. 14. Fig. 17 represents in side elevation a detail view of the central larger gear-wheel with shaft connecting it with the central gear for actuating the pendulum-rod. Fig. 18 represents a diagrammatic plan view of the switch for closing and opening the electric circuit. Fig. 19 represents a detail sectional view of a portion of the base and bearing of the pedestal, showing the contact-rings and means for completing the electric circuit from the terminal wires. Fig. 20 represents in side elevation a detail view of another form of mechanism for actuating the pendulum-rod from that shown in the foregoing views. Fig. 21 represents in cross-section an enlarged detail view of one of the side gears shown in Fig. 20 and the friction-clutch mechanism whereby they are operated. Fig. 22 represents in side elevation, with a portion broken away, a detail view of a screw-threaded sector which may be used instead of the nut shown in Fig. 20; and Fig. 23 represents a section taken along the line 23 23 of Fig. 22 and looking in the direction of the arrow.

Similar letters and numerals refer to similar parts throughout the several views.

Among other parts the improved search-light mount consists of a hollow column A, made cylindrical throughout a portion of its length, then diminishing in diameter toward its upper end. This column has a concavo-convex bottom *a*, provided with a circular flange in which is cut the annular groove $a'$, which engages the balls $a^0$, resting in a similar groove in the truncated conical portion $a^2$ of the base A'. This base is provided with a concave top to conform with the convexity of the bottom of the column, both of which are provided with a central opening through which passes the bolt $a^3$, carrying the spring $a^4$, by means of which arrangement the parts are held together at any desired tension and prevented from being displaced except at such times as desired.

Around the inside and near the bottom of the movable column A are two metallic rings $m$ $m'$, insulated from the column A as at $m'$. These rings form the terminals of the main electric circuit to the search-light, and the contact with them from the supply-wires $m^3$ $m^4$ is maintained by means of the roller-contacts $m^2$, insulated from the base A' and pivoted as at $m^5$. The said roller-contacts are held against the rings $m'$ $m^2$ by the springs $m^6$, while the supply-wires $m^4$ $m^3$ enter the base through the insulated way $m^7$, which is all most clearly shown in Fig. 19. The whole column A is revolved about its vertical axis by means of the hand-wheel $A^0$, mounted on the shaft $a^0$, carried by the column. This shaft carries on its lower end a beveled gear $a^{00}$, which meshes with a circular beveled rock $A^2$, rigidly mounted on the base A' by means of the uprights $A^3$. By this structure it is obvious that the search-light and mount may be turned through an angle of three hundred and sixty degrees around a vertical axis.

The upper end of the column A is provided with the ball-bearings $a^5$, in which is journaled the trunnions $B^0$ of the angle-irons $b$, upon the upper faces of which is mounted the rocking platform B. This platform B is provided with a depression B', upon which is mounted the gyroscope D. Secured to the angle-irons $b$ and between the trunnions $B^0$ is the head $e$ of a depending arm or pendulum-rod E. This pendulum-rod terminates at its lower end in a trough-like sector $e'$, having the side flanges $e^2$, the convex side of said sector being open and the concaved side closed. The sides or flanges of this sector span a small rotating cylinder $f$, though not in actual contact with it normally. On each side of the sector $e'$ are the cylinders $f'$ and $f^2$, similar to the central one and also normally almost in contact with the sides of the sector. These three cylinders $f, f'$, and $f^2$ terminate at their lower ends in the gears F, F', and $F^2$, which are so mounted on the cross-piece $F^0$ as to mesh with each other, which is most clearly shown in Fig. 14.

The central gear F is keyed to the shaft $f^9$, and near the lower end of said shaft is secured the gear-wheel $F^3$. This gear-wheel $F^3$ in turn meshes with a pinion $F^4$ on the head of the armature-shaft $k$ of the electric motor K. The gear-wheels F' and $F^2$ of the cylinders $f'$ and $f^2$ are so loosely meshed with the central gear F that they are capable of slight movement toward and away from the sector, thus bringing pressure to bear upon the sector from either one side or the other—e. g., if $f^2$ is moved toward the central cylinder $f$ one side of the sector is compressed between the two cylinders and the sector partakes of the movement of the two rotating surfaces of the cylinders in contact with it. If the cylinder $f'$ is brought to bear on the sector, the resultant movement is reversed—that is, the sector travels in the opposite direction to the movement produced by the rotation of cylinder $f^2$. This slight movement of the two pressure-cylinders $f'$ and $f^2$ is brought about by the levers $f^3$ and $f^4$, having upon their lower ends the armatures $f^7$ and $f^8$, respectively.

The levers $f^3$ and $f^4$ pass through the cross-piece $F^0$, in which they are pivoted at the points $f^5$ and $f^6$, the holes through the cross-piece being elongated to allow a free movement of the levers passing through them. The pressure-cylinders $f'$ and $f^2$, while being allowed to rotate on the ends of the levers $f^3$ and $f^4$, are snugly mounted thereon to prevent lost motion.

The levers $f^3$ and $f^4$, which actuate the pressure-rollers, are themselves actuated by the electromagnets H and H', the magnet H attracting the armature $F^7$ actuates the lever $f^3$ and hence the cylinder $f'$, while the cylinder $f^2$ is similarly acted upon by the magnet H' through the armature $f^8$ and lever $f^4$.

The portion of the sector $e'$ extending beyond the sides of the column is protected by the wings $A^{00}$, forming a portion of the column.

It will thus be seen from the mechanism so far described that the platform B, oscillating about the trunnion $B^0$ as an axis, receives its motion from the pendulum-rod E, which is controlled by and derives its motion from the rotating cylinders above described.

To check the motion of the sector and therefore bring the platform B to rest at the proper time, though not absolutely essential, a brake mechanism is used, which consists of the two thrust-springs E', mounted in a small frame $e^4$, which frame is loosely mounted on the pendulum-rod E, while the lower member of the thrust-spring is rigidly secured to the said pendulum-rod, so that when the frame $e^4$ is pulled downward the ends of the springs having the brake-shoes $e^3$ are thrust outward, coming in friction contact with two contact-pieces $e^6$. This frame $e^4$, carrying the springs, is pulled downward at the proper time by the electromagnets $E^2$, which attract the armatures $e^5$, attached to the said frame. The excitation of the magnets $E^2$ is produced when the magnets H and H' are inactive—that is, when the influence of the rotating cylinders on the sector ceases. Just how the excitation of the magnets $E^2$ at the proper time is brought about is illustrated most clearly by the mechanism shown in Fig. 13.

The wires $h$ and $h'$ from the magnets $E^2$ are connected, respectively, to the metallic arm $h^2$ and the spring-contact piece $h^4$, which latter, as long as the magnet H is not energized, is held in contact with the contact-screw $h^3$ of the arm $h^2$, which completes the circuit through the magnets $E^2$, but immediately that the magnet H becomes energized its pole attracts the contact-piece $h^4$ and breaks the circuit, which causes the magnets $E^2$ to release their armature and thus allow the thrust-springs to disengage the contact-pieces $e^6$; but it will be obvious that since there are two such contact devices, as illustrated in Fig. 13, and each in series in the circuit of the magnets $E^2$, one operated by magnet H and the other by magnet H', the brake mechanism will only become active when both magnets H and H' are simultaneously inactive or not energized.

From what has gone before it will be seen that the position of the pendulum-rod which controls the position of the rocking platform B is dependent for its movement on whether the magnets H and H' are energized or not—that is, as long as H is energized the angular movement of the platform B, carrying the search-light, will be in one direction, and so long as H' is energized its motion will be in the opposite direction. The excitation of these magnets is accomplished at the proper time by means of the gyroscope D and its accompanying contact mechanism, all of which are mounted on the depression B' in the regular rocking platform B. This improved gyroscope is actuated by electricity, and by virtue of its power to maintain its own plane is made to close certain electric circuits which operate the mechanism of the search-light mount, as above described. This gyroscope and contact mechanism is most clearly illustrated in the detail views Figs. 6, 7, 8, 9, 10, 11, and 12. The precessional ring D' of the gyroscope is mounted between the uprights P and N on the bearing-screws $p$ and $n$, the upright N being insulated from the platform, while the screw $p$ engages the insulated bearing $d'$, carried by the precessional ring. The inner frame $D^2$ of the gyroscope is mounted within the precessional on the screws $d^3$ and $d^{16}$, the screw $d^3$ being insulated from the precessional and also engaging a bearing $d^4$, insulated from the inner ring. Within the inner ring is mounted a heavy fly-wheel $D^3$ on the bearing-screws $d^{17}$ and $d^{18}$. This fly-wheel acts as an armature which is rotated by the action of the electromagnets $D^6$, carried by the inner ring, which magnets are periodically energized by having a brush $d^{19}$ make contact with one of the spokes of said wheel as they pass beneath it.

Attached to the precessional ring and swinging beneath the same is the metallic bow $d$, which carries the platinum contact-point X, this bow being rigidly secured to the precessional, so as to be held always in a plane at right angles to that of the precessional.

Now from the principle of the gyroscope it will be readily understood that the precessional ring D' will maintain its horizontal plane as long as the fly-wheel $D^3$ is kept rotating at a proper speed, and it will be furthermore readily seen that the platform B', upon which the said gyroscope is mounted, will have a tendency to partake of the motion of the body supporting it, which in this instance will be assumed to be a ship. Therefore a divergence of the horizontal planes of the gyroscope and platform B will take place whenever the platform by the motion of the ship is thrown out of its horizontal plane, and the amplitude of this divergence of the two planes will be measured by an arc described by the platinum point X. Clearly, then, it will be seen how the said platinum point may be made to make contact with an electrical conductor placed on each side of the point X and within the arc described by the divergence of the planes, and by so completing an electric circuit every time there is a divergence between the said planes the above-described electromagnets H and H' are energized, which, as explained, act immediately to restore the parallelism between the horizontal planes of the said gyroscope and rocking platform supporting it. The contact device through which the said electric circuit is completed by the platinum point X is most clearly illustrated in the detail views Figs. 7, 8, 9, 10, 11, and 12. Upon the platform B' and directly under the gyroscope are two insulating-ways W, in which slide two metal jaws S and S', carrying each a platinum wire $s$ and $s'$, supported and rendered taut by the bow-shaped springs $s^2$ and $s^3$, secured to the sliding jaws near their ends. The jaws S and S' have rearwardly-extending metal bases $S^2$ and $S^3$, which are electrically connected with the binding-posts T and T' by the sliding contact-pieces V and V'. As long as the horizontal planes of the platform and gyroscope are parallel, the platinum joint hangs midway between the platinum wires $s$ and $s'$, so that upon the distance between the wires $s$ and $s'$ will depend the amount of divergence between the two planes before the point X makes the contact with either of the wires $s$ or $s'$. This distance may be varied by the right and left handed milled screw Q, which is screw-threaded to fit the left-handed tap $q^2$, carried by and insulated from jaw S, and the right-handed tap $q^3$, similarly insulated from and carried by the jaw S', so that by turning this screw Q the jaws S and S' may be made to either approach or recede from each other simultaneously. The two jaws are simultaneously moved or adjusted in the same direction by means of a second adjusting-screw R, which carries the shifting-sleeve $q'$, having a collar $q$, which engages the adjusting-screw Q. Hence by turning the screw R one of the wires $s$ or $s'$ may be brought nearer to the point X, while at the same time the other wire is shifted farther away from it, or vice versa, as the case may be. This second screw R is secured at one end in a stand $r$ and passes through an insulated way in the binding-post T'. If found desirable, the mounting of the gyroscope relative to the position of the uprights P and N may be changed, as shown in Fig. 5. In this instance the uprights are placed in position ninety degrees from that shown in the other views, the contact mechanism on the platform remaining the same, though, however, in this case instead of the bow $d$ a straight connector-spring $d^0$ is employed, which carries a platinum point similar to X, but the connector-spring is attached to the center of the under side of the inner frame and coincides with a theoretical prolongation of the axis of the fly-wheel. This form is not preferred, however, to that first described.

Though the gyroscope is shown in the accompanying drawings mounted on the depression-platform B' in such a manner that a theoretical prolongation of the trunnion B⁰ would pierce the pivotal points of support of the precessional ring, this mounting is not absolutely necessary, as the gyroscope may, if found more convenient, be mounted in many other positions about the mount without altering its effect.

Especial reference is now had to Figs. 2 and 6, in which the paths of the electric current may be more easily traced and their action more readily understood. The current from the source of supply coming on the positive wire (shown at the bottom of Fig. 2) enters the roller-contact piece $m^2$, in engagement with the upper insulated ring $m$, from which it passes by wire 1 to the arc-light, and, returning by wire 2, enters the insulated ring $m'$, and then passes out on the negative wire through the other roller-contact. A portion of this current going in positive wire 1 is shunted into the wire 3, which wire may be connected in the shunt-circuit by means of the switch L. The current from the wire 3 enters the insulated standard P of the gyroscope, and by means of the insulated bearing $d'$ and screw $p$ this current does not enter the precessional ring there, but passes through the insulated bearing $d'$ and into a conductor $d^2$, connected to said bearing, then around to the screw $d^3$, where it enters another insulated bearing $d^4$, from which the current branches into two insulated conductors $d^5$ and $d^6$, and thence into the field-magnet coils $d^7$ and $d^8$, then by wires $d^9$ and $d^{10}$ into the magnet-coils $d^{11}$ and $d^{12}$, from which the current then passes by insulated wires $d^{13}$ and $d^{14}$, when these branch circuits unite on the insulated block $d^{15}$ and pass into the brush $d^{19}$. From the brush $d^{19}$ the current passes into the fly-wheel through its spokes, which come in contact with the brush while the said wheel revolves, and from the center of the fly-wheel the current passes through the bearings $d^{17}$ and $d^{18}$ into the inner frame $d^2$, from which it passes through the screw $d^{16}$ into the precessional ring, then around to the standard N, through the screw $n$, and back to the negative wire 2 of the light-circuit. The metallic contact-bow $d$, which carries the platinum point X, being insulated from the contact-piece $d'$ and in electrical connection with the precessional ring below the screw $n$, whenever the platinum point makes contact with either of the wires $s$ or $s'$ the current entering the upright N will be joined by the current which branches from the plus-wire and enters the magnets H and H', the magnet H or H' becoming energized according to whether the platinum point touches wire $s$ or $s'$.

The motor K is driven by the current in circuit 5 6. Another portion of the current from the plus wire 5 is shunted by wire 10 through the contact-pieces $h^2$ and $h^4$ whenever the magnets H and H' are not energized, as explained, whence it passes to the magnet $E^2$, and then back to the negative wire 6. The current from the light-circuit positive wire 1 is shunted into the branch circuit by the switch L. (Shown most clearly in Figs. 3, 4, and 18.) This switch is journaled in two insulated bearings L' and L², which are connected to the wires 1 and 2 of the light-circuit. Electrical connection is made from these bearings to the contact-blades L³ and L⁴, carried on top of each of the arms of the switch.

L⁵ and L⁶ are two pairs of spring-jaws insulated from the column on which they are mounted and adapted to engage the contact-blades L³ and L⁴ when the handle of the switch is thrust down, which will throw into the circuit the wires 3 and 4. This switch serves the twofold purpose of switch and retainer for the pendulum-rod, and for this purpose is made bifurcated.

When the branch circuit 3 4 is not in use, obviously the pendulum-rod will also not be in use. Therefore to retain the rod in a position of rest when not usefully employed it may be held between the arms of said switch, and as the arc described by the rod at a point where it would be engaged by the bifurcated switch is small the rod will generally be caught between the said arms when the latter is lowered.

The above-described method of shifting the pendulum-rod E by the contact-cylinders is capable of modifications and substitutions which may in some cases be preferable. A method of shifting the said pendulum-rod E which may be substituted for that above described is illustrated in Figs. 20 and 21. In this instance the pendulum-rod $E^4$ is connected at its lower end by an arm $e^{11}$ to the arm of the upright $e^{10}$, which latter is secured to a nut $e^9$. This nut $e^9$ is screw-threaded to fit a tangent-screw $E^5$, and mounted on each end of the said tangent-screw are the gear-wheels $E^6$ and $E^7$, engaging a third and larger gear $E^8$, the latter being carried upon the head of a shaft $E^9$, driven by the motor K. The gears $E^6$ and $E^7$ each have an annular hollow projection $e^{12}$ on one of their faces. The gear-wheels $E^6$ and $E^7$ are mounted loosely on the ends of the tangent-screw $E^5$, and that portion of the screw which passes through the hollow projection is provided with a rectangular orifice $e^{13}$, (shown in Fig. 21,) and in this orifice are pivoted the arms $e^{14}$ of a friction-clutch. These arms are pivoted to the end of a plunger $e^{15}$, which enters the end of the tangent-screw. Just outside of the frame supporting the ends of the tangent-screw $E^5$ are pivoted the levers $e^{19}$, as at $e^{20}$, and each lever carries a small adjustable contact-screw $e^{18}$, with the interchangeable point $e^{16}$.

Near the lower ends of the levers $e^{19}$ are the magnets $H^2$ and $H^3$. Now it will be seen that when, for example, the magnet $H^2$ becomes energized, which will happen under the same conditions as explained for the magnets H and H', the said magnet will attract the lower end of the lever $e^{19}$, which will force the contact-screw $e^{18}$ against the plunger $e^{15}$, which will thrust the arms of the friction-clutch outward, causing friction between the said arms and the inner portion of the annular projections on the gear-wheel $E^6$. This will cause the tangent-screw to partake of the motion of the gear-wheel $E^6$ and revolve. The gears $E^6$ and $E^7$, it will be noted, are kept revolving as long as the gear $E^8$ does so. It will therefore be seen that when by the action of the friction-clutch the screw $E^5$ is caused to revolve the nut $e^9$ will be shifted in one direction, say to the left, and likewise when the screw is set in motion by the clutch carried by the wheel $E^7$ the nut will be accordingly shifted to the right. Hence it will be seen that the pendulum-rod $E^4$ will be shifted to the right or left, dependent upon the direction of travel of the nut upon the tangent-screw $E^5$.

Instead of the pendulum-rod being connected to a nut on a tangent-screw it may be found preferable in some cases to substitute the form of pendulum-rod shown in Figs. 22 and 23. In this instance the pendulum-rod terminates at its lower end in a screw-threaded sector $e^8$, which may be made to engage the tangent-screw $E^5$ and shifted to the right or left, according to the direction of rotation of the tangent-screw.

The search-light proper, C, may be mounted in the rocking platform and rotated about its own horizontal axis by any well-known means. It is herein shown mounted on trunnions in a bifurcated stand and adapted to be rotated around its horizontal axis by operating a crank-arm attached thereto. This feature, however, forms no part of the invention, and therefore requires no further description.

The many attempts to devise a practical means for directing the beam from a search-light have invariably been met either by total failures or have consisted of such complex and complicated apparatus, usually a multiplicity of electric circuits, switches, and accompanying apparatus, as to render the whole objectionable. But even in the latter instance the plan is one which would be better suited were the search-light mounted on shore, where the rolling of a ship is not encountered, and in fact such devices could hardly be said to claim to compensate for the rolling and pitching of a ship. Therefore it will be seen from the device herein described that not only is a novel means for overcoming these disturbing influences of the ship accomplished, but one which is self-acting, simple of construction, accurate and delicate in its regulation, and certain in its action.

Necessarily all sweeping of the horizon with the light in rough weather must be done by turning the whole mount on its vertical axis. After setting the search-light in the compensating plane, the beam being propagated at right angles to the trunnion, all movements that can disturb the horizontal pencil of light are eliminated, the result being a twist of the field of light around its own center.

While the gyroscope as herein described is a simple one—that is, having a single gyrating wheel—it is obvious that a more accurate regulation would be attainable by employing a compound gyroscope, one having two gyrating wheels rotating in opposite directions, which would render it absolutely free from precessional disturbances. This, however, is an obvious mechanical modification and does not involve invention over the simple form herein described. In either case, however, in practice it may be found necessary to weight the gyroscope a little on its under side to prevent its losing its original plane should it happen to "race" or "run wild." Indeed, the whole mount is capable of many modifications and changes which might be made without departing from the true spirit of the invention; but

What we claim, and desire to secure by Letters Patent of the United States, is—

1. A search-light mount consisting of a column revoluble about its vertical axis, a stationary base supporting said column, a platform surmounting said column and capable of angular displacement around a horizontal axis, means for displacing said platform around said axis and a gyroscope controlling said means, substantially as described.

2. In a search-light mount the combination with a base, of a vertical column mounted on said base and revoluble about its vertical axis, a platform mounted on trunnions near the upper end of said column, means for imparting to said platform angular displacement around a horizontal axis and a gyroscope mounted on said platform for controlling said means, substantially as described.

3. In a search-light mount, the combination with a stationary base, of a vertical hollow column mounted on ball-bearings on said base and capable of revolution around its vertical axis, a platform surmounting said column, means for maintaining said platform in a horizontal plane and a gyroscope for controlling said means, substantially as described.

4. In a search-light mount, the combination with a stationary base, of a vertical column mounted on said base and capable of revolution around its vertical axis, bearings near the upper end of said column, a platform having trunnions journaled in said bearings, means for maintaining said platform in a horizontal plane and a gyroscope for controlling said means, substantially as described.

5. In a search-light mount, the combination with a stationary base provided with a ball-bearing, of a vertical column mounted on said ball-bearing and revoluble about its vertical axis, a circular rack carried by said base, a pinion engaging said rack, with means for revolving the same carried by said column, a platform surmounting said column and capable of angular displacement about a horizontal axis, means for maintaining said platform in a horizontal plane and a gyroscope for controlling said means, substantially as described.

6. In a search-light mount, the combination with a stationary base having a ball-bearing, of a vertical column mounted on said bearing and revoluble about a vertical axis, a circular rack carried by said base, a pinion engaging said rack, a hand-wheel and a shaft for rotating said pinion, a platform surmounting said column, means for maintaining said platform in a horizontal plane, and a gyroscope for controlling said means, substantially as described.

7. In a search-light mount, the combination with a stationary base, of a hollow vertical column mounted on said base, and revoluble around its vertical axis, bearings near the upper end of said column, a platform having trunnions journaled in said bearings, a depending arm attached to said platform, means for causing the angular displacement of said arm around the axis of said trunnions, and a gyroscope for regulating the said means of displacement, substantially as described.

8. A search-light mount consisting of a hollow column revoluble about its vertical axis, a stationary base supporting said column, a platform surmounting said column and capable of angular displacement around a horizontal axis, means for displacing said platform around said axis and an electrical gyroscope controlling said means, substantially as described.

9. In a search-light mount the combination with a base, of a vertical hollow column mounted on said base and revoluble about its vertical axis, a platform mounted on trunnions near the upper end of said column, means for imparting to said platform angular displacement around a horizontal axis, an electrical gyroscope mounted on said platform for controlling said means, and a contact device mounted beneath said gyroscope for completing the electrical circuit, substantially as described.

10. In a search-light mount, the combination with a stationary base, of a vertical hollow column mounted on ball-bearings on said base and capable of revolution around its vertical axis, a platform surmounting said column, means for maintaining said platform in a horizontal plane and an electrical gyroscope for controlling said means, substantially as described.

11. In a search-light mount, the combination with a stationary base, of a vertical hollow column mounted on said base and capable of revolution around its vertical axis, bearings near the upper end of said column, a platform having trunnions journaled in said bearings, means for maintaining said platform in a horizontal plane and an electrical gyroscope for controlling said means, substantially as described.

12. In a search-light mount, the combination with a stationary base provided with a ball-bearing, of a vertical hollow column mounted on said ball-bearing and revoluble about its vertical axis, a circular rack carried by said base, a pinion engaging said rack, with means for revolving the same carried by said column, a platform surmounting said column and capable of angular displacement about a horizontal axis, means for maintaining said platform in a horizontal plane and an electrical gyroscope for controlling said means, substantially as described.

13. In a search-light mount, the combination with a stationary base having a ball-bearing, of a vertical hollow column mounted on said bearing and revoluble about a vertical axis, a circular rack carried by said base, a pinion engaging said rack, a hand-wheel and a shaft for rotating said pinion, a platform surmounting said column, means for maintaining said platform in a horizontal plane, and an electrical gyroscope for controlling said means, substantially as described.

14. In a search-light mount, the combination with a stationary base, of a hollow vertical column mounted on said base, and revoluble around its vertical axis, bearings near the upper end of said column, a platform having trunnions journaled in said bearings, a depending arm attached to said platform, means for causing the angular displacement of said arm around the axis of said trunnions, and an electrical gyroscope for regulating the said means of displacement, substantially as described.

15. In a search-light mount, the combination with a stationary base having a ball-bearing, of a vertical column mounted on said ball-bearing and revoluble about its vertical axis, a circular rack mounted on said base, a pinion engaging said rack, a hand-wheel and shaft carried by said column for rotating said pinion, a bearing near the upper end of said column, a platform having trunnions journaled in said bearings, a depending arm attached to said platform, means for imparting angular displacement to said arm around the axis of said trunnions, electromagnets for operating said means of displacement, and a gyroscope for controlling the excitation of said magnets, substantially as described.

16. In a search-light mount, the combination with a stationary base having a ball-bearing, of a vertical column mounted on said ball-bearing and revoluble about its vertical axis, a circular rack mounted on said base, a pinion engaging said rack, a hand-wheel and shaft carried by said column for rotating said pinion, a bearing near the upper end of said column, a platform having trunnions journaled in said bearings, a depending arm attached to said platform, means for imparting angular displacement to said arm around the axis of said trunnions, electromagnets for operating said means of displacement and an electrical gyroscope for controlling the excitation of said magnets, substantially as described.

17. In a search-light mount, the combination with a stationary base having a ball-bearing, of a vertical hollow column mounted on said ball-bearing and revoluble about its vertical axis, a circular rack mounted on said base, a pinion engaging said rack, a hand-wheel and shaft carried by said column for rotating said pinion, a bearing near the upper end of said column, a platform having trunnions journaled in said bearings, a depending arm attached to said platform and carried within said column, means for imparting angular displacement to said arm around the axis of said trunnions, electromagnets for operating said means of displacement and an electrical gyroscope carried by said platform for controlling the excitation of said magnets, substantially as described.

18. In a search-light mount, the combination with a stationary base having a ball-bearing, of a vertical column mounted on said ball-bearing and revoluble about its vertical axis, a circular rack mounted on said base, a pinion engaging said rack, a hand-wheel and shaft carried by said column for rotating said pinion, a bearing near the upper end of said column, a platform having trunnions journaled in said bearings, a depending arm attached to said platform, means for imparting angular displacement to said arm around the axis of said trunnions, electromagnets for operating said means of displacement, brake mechanism carried by said arm for arresting the motion of the same, and a gyroscope for controlling the excitation of said magnets, substantially as described.

19. A search-light mount consisting of a hollow column revoluble about its vertical axis, a stationary base supporting said column, a platform surmounting said column and capable of angular displacement around a horizontal axis, a search-light mounted on said platform, means for displacing said platform around said axis and an electrical gyroscope controlling said means and mounted on a depression in said platform, substantially as described.

20. In a search-light mount the combination with a base, of a vertical hollow column mounted on said base and revoluble about its vertical axis, a platform mounted on trunnions near the upper end of said column, a search-light mounted on said platform, means for imparting to said platform angular displacement around a horizontal axis, an electrical gyroscope mounted on said platform for controlling said means, and a contact device mounted beneath said gyroscope for completing the electrical circuit, substantially as described.

21. In a search-light mount, the combination with a stationary base, of a vertical hollow column mounted on ball-bearings on said base and capable of revolution around its vertical axis, a platform surmounting said column, a search-light mounted on said platform, means for maintaining said platform in a horizontal plane, an electrical gyroscope mounted on said platform for controlling said means, and contact mechanism for closing the electric circuit carried beneath said gyroscope, substantially as described.

22. In a search-light mount, the combination with a stationary base, of a vertical hollow column mounted on said base and capable of revolution around its vertical axis, bearings near the upper end of said column, a platform having trunnions journaled in said bearings, a search-light mounted on said platform, means for maintaining said platform in a horizontal plane, an electrical gyroscope for controlling said means mounted on said platform, and contact mechanism beneath said gyroscope for closing the electric circuit, substantially as described.

23. In a search-light mount, the combination with a stationary base provided with a ball-bearing, of a vertical hollow column mounted on said ball-bearing, and revoluble about its vertical axis, a circular rack carried by said base, a pinion engaging said rack, with means for revolving the same carried by said column, a platform surmounting said column, a search-light mounted on said platform and capable of angular displacement about a horizontal axis, means for maintaining said platform in a horizontal plane and an electrical gyroscope for controlling said means mounted upon said platform, a contact mechanism beneath said gyroscope for closing the electric circuit, substantially as described.

24. In a search-light mount, the combination with a stationary base having a ball-bearing, of a vertical hollow column mounted on said bearing, and revoluble about a vertical axis, a circular rack carried by said base, a pinion engaging said rack, a hand-wheel and a shaft for rotating said pinion, a platform surmounting said column, a search-light mounted on said platform, means for maintaining said platform in a horizontal plane, an electrical gyroscope for controlling said means mounted on said platform, and contact mechanism beneath said gyroscope for closing the electric circuit, substantially as described.

25. In a search-light mount, the combination with a stationary base, of a hollow vertical column mounted on said base, and revoluble around its vertical axis, bearings near the upper end of said column, a platform having trunnions journaled in said bearings, a search-light mounted on said platform, a depending arm attached to said platform, means for causing the angular displacement of said arm around the axis of said trunnions, brake mechanism carried by said arm for arresting the motion of the same, and an electrical gyroscope for regulating the said means of displacement, substantially as described.

26. In a search-light mount, the combination with a stationary base having a ball-bearing, of a vertical column mounted on said ball-bearing, and revoluble about its vertical axis, a circular rack mounted on said base, a pinion engaging said rack, a hand-wheel and shaft carried by said column for rotating said pinion, a bearing near the upper end of said column, a platform having trunnions journaled in said bearings, a search-light mounted on said platform, a depending arm attached to said platform, brake mechanism carried by said arm for arresting the motion of the same, means for imparting angular displacement to said arm around the axis of said trunnions, electromagnets for operating said means of displacement and a gyroscope for controlling the excitation of said magnets, substantially as described.

27. In a search-light mount, the combination with a stationary base, of a vertical column mounted on said base, and revoluble around its vertical axis, a platform surmounting said column, and capable of angular displacement around a horizontal axis, a depending arm attached to said platform, a sector carried by the said arm, means for imparting angular motion to said sector, electromagnets operating said means and a gyroscope controlling the excitation of said magnets, substantially as described.

28. In a search-light mount, the combination with a stationary base, of a vertical hollow column mounted on said base, and revoluble around its vertical axis, a platform surmounting said column and capable of angular displacement around a horizontal axis, a depending arm attached to said platform, a sector carried by the said arm, means for imparting angular motion to said sector, electromagnets operating said means and an electrical gyroscope controlling the excitation of said magnets, substantially as described.

29. In a search-light mount, the combination with a stationary base, of a vertical column, mounted on said base and revoluble around its vertical axis, a platform surmounting the said column and capable of angular displacement around its horizontal axis, a depending arm attached to said platform, a sector carried by said arm, a plurality of rotating surfaces near said sector, means for rotating said surfaces, levers for bringing said surfaces in contact with said segment, electromagnets for operating said levers, and a gyroscope for controlling the said magnets, substantially as described.

30. In a search-light mount, the combination with a stationary base, of a vertical hollow column mounted on said base and revoluble around its vertical axis, a platform surmounting the said column and capable of angular displacement around its horizontal axis, a depending arm attached to said platform, a sector carried by said arm, a plurality of rotating surfaces near said sector, means for rotating said surfaces, levers for bringing said surfaces in contact with said segment, all carried within said column, electromagnets for operating said levers, and an electrical gyroscope for controlling the said magnets, substantially as described.

31. The combination with a stationary base, of a vertical column mounted on said base and revoluble around its vertical axis, a platform surmounting said column and capable of angular displacement around a horizontal axis, a depending arm attached to said platform, a sector carried by said arm, a plurality of cylinders near said sector, gear-wheels carrying said cylinders, means for rotating said gears, levers for bringing the said cylinders in contact with said sector, electromagnets for operating said levers and a gyroscope for controlling the excitation of said magnets, substantially as described.

32. In a search-light mount, the combination with a stationary base, of a vertical column, mounted on said base and revoluble around its vertical axis, a platform surmounting the said column and capable of angular displacement around its horizontal axis, a depending arm attached to said platform, a sector carried by said arm, a plurality of rotating surfaces near said sector, an electric motor for rotating said surfaces, levers for bringing said surfaces in contact with said segment, electromagnets for operating said levers, and a gyroscope for controlling the said magnets, substantially as described.

33. The combination with a stationary base, of a vertical column mounted on said base and revoluble around its vertical axis, a platform surmounting said column and capable of angular displacement around a horizontal axis, a depending arm attached to said platform, a sector carried by said arm, a plurality of cylinders near said sector, gear-wheels carrying said cylinders, means for rotating said gears, levers for bringing the said cylinders in contact with said sector, electromagnets for operating said levers and an electrical gyroscope for controlling the excitation of said magnets, substantially as described.

34. In a search-light mount, the combination with a stationary base, of a vertical column mounted on the said base and revoluble about its vertical axis, a platform surmounting said column and capable of displacement around a horizontal axis, a depending arm attached to said platform, a flanged sector carried by said arm, a cylinder between the flanges of said sector, cylinders near the outside of said flanges, gear-wheels attached to the said cylinders and meshing with each other, a shaft engaging one of said gears, an electric motor connected to said shaft for rotating the same, levers engaging the other gears, electromagnets operating said levers to bring said cylinders in contact with said sector, and a gyroscope for controlling the excitation of said magnets, substantially as described.

35. In a search-light mount, the combination with a stationary base, of a vertical column mounted on said base and revoluble around its vertical axis, a platform surmounting said column and capable of angular displacement about a horizontal axis, a depending arm attached to said platform, a rectangular frame loosely mounted on said arm, thrust-springs carried by said frame with one secured to said arm, brake-shoes carried by the ends of said springs, contact-surfaces for the engagement of said shoes carried by said column, electromagnets carried by said arm and adapted to move said frame so as to compress said springs, means for imparting angular motion to said arm, electromagnets operating said means and an electrical gyroscope and contact mechanism for controlling the excitation of said magnets, substantially as described.

36. In a search-light mount, the combination with a stationary base having a ball-bearing, of a vertical hollow column mounted on the said ball-bearing and revoluble around its vertical axis, a circular rack mounted on said base, a pinion engaging said rack, a hand-wheel and shaft carried by said column for rotating said pinion, a ball-bearing near the upper end of said column, a platform having trunnions mounted in said bearings, a depending arm connected to said platform, a flanged sector carried by said arm, a cylinder between the flanges of said sector, cylinders near the outside of said flanges, gear-wheels attached to the said cylinders and meshing with each other, a shaft engaging one of said gears, an electric motor connected to said shaft, levers engaging the other of said gears, electromagnets operating said levers to bring said cylinders in contact with said sector, and an electrical gyroscope and contact device for controlling the excitation of said magnets, substantially as described.

37. In a search-light mount, the combination with a stationary base, of a vertical column mounted on said base and capable of revolution around its vertical axis, a platform surmounting said column and capable of angular displacement around a horizontal axis, a search-light mounted on said platform, a depending arm attached to said platform, means for imparting angular displacement to said arm, brake mechanism for arresting the motion of said arm and carried by the same, electromagnets for operating the said means for displacing the said arm, an electrical gyroscope and contact apparatus mounted on said platform for controlling said means, electric conductors connecting said gyroscope, magnets and brake mechanism in circuit and a switch mounted on said column adapted to connect the said parts in circuit and also adapted to retain the aforesaid arm in one position when the latter is not in use, substantially as described.

38. In an electrical gyroscope, the combination with the upright supports, of a precessional ring pivoted between said supports, an inner frame pivoted within said precessional ring, electromagnets carried by said inner frame, a fly-wheel also carried by said frame and adapted to be rotated by said magnets, and an electrical conductor suspended from the said gyroscope, substantially as described.

39. In an electrical gyroscope, the combination with upright supports, of a precessional ring pivoted between the said supports, an inner frame pivoted within the precessional ring, electromagnets carried by said frame, a fly-wheel mounted in said frame, and adapted to rotate between the poles of said magnets, a brush carried by said frame for making and breaking the electric circuit through said fly-wheel, and a depending electric conductor carried by said gyroscope, substantially as described.

40. In an electrical gyroscope, the combination with the upright supports, of pivot-screws carried by said uprights, a precessional ring having an insulated bearing in contact with one of said screws and an uninsulated bearing in contact with the other screw, a frame mounted within said precessional ring so that one bearing is insulated from said ring and the other in electrical connection with it, an electric conductor connecting the insulated bearings of said precessional ring, electromagnets carried by the said inner frame, a fly-wheel having spokes and pivoted in said frame, so as to rotate between the poles of said magnets, a brush making and breaking the electric circuit through the spokes of the said fly-wheel, conductors connecting said brush with said magnets and a depending arm from said gyroscope carrying a platinum point, substantially as described.

41. In combination with an electrical gyroscope and circuit, a contact device which consists of two electric conductors carried by sliding jaws mounted in insulating-ways, with means for varying the distance between the two conductors and moving the said conductors simultaneously either to the right or left and electric conductors connecting said jaws with the terminals of the electric circuit, substantially as described.

42. In combination with an electrical gyroscope and circuit, a contact device which consists of two sliding jaws mounted in insulating-ways and carrying each an electric conductor, a screw engaging said jaws for varying the distance between the same, a second screw engaging a sleeve connected to the first screw for shifting said jaws simultaneously in the same direction, and electric conductors connecting said jaws with the terminals of the electric circuit, substantially as described.

43. The combination with an electric circuit and electrical gyroscope, having a depending electric conductor, of sliding jaws mounted on each side of said conductor, insulating-ways carrying said jaws, electric conductors carried by said jaws and adapted to make contact with said depending conductor, insulated collars carried by said jaws, a screw engaging said collars for varying the distance between said jaws, a second screw, and a sleeve attached to said first screw, by which the said jaws may be moved simultaneously in the same direction, conductors adapted to make sliding contact with said jaws and connect the same with the electric terminals, substantially as described.

44. In a brake mechanism for arresting the motion of an oscillating arm, the combination with a rectangular frame loosely mounted upon said arm, thrust-springs carried by said frame, one of which is secured to said arm, brake-shoes carried by said springs, contact-surfaces for the engagement of said shoes and an electromagnet adapted to move the said frame and compress the said springs, substantially as described.

45. In a brake mechanism for arresting the motion of an oscillating arm, the combination with a rectangular frame loosely mounted on said arm, thrust-springs carried within said frame, one of which is secured to the said arm, brake-shoes carried by the said springs, contact-surfaces for the engagement of said shoes, an armature carried by said frame, an electromagnet carried by said arm and adapted to attract said armature and compress said springs, and electromagnets adapted to complete the circuit through the magnet on said arm when not energized and to break the circuit through said arm when energized, substantially as described.

In testimony whereof we affix our signatures in presence of two witnesses.

FRANCIS T. MARCHAND.
GEORGE E. MARCHAND.

Witnesses:
F. THORNTON ARMS,
K. M. NELSON.